July 19, 1949.  F. H. NICOLL  2,476,898
SCHMIDT-TYPE IMAGE PROJECTION APPARATUS
Filed Nov. 28, 1944
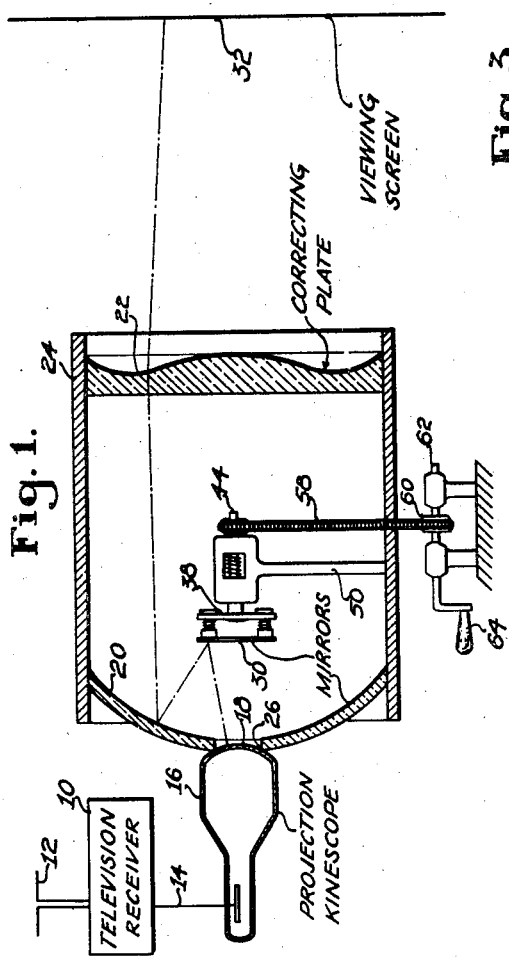
INVENTOR.
FREDERICK H. NICOLL
BY
ATTORNEY Patented July 19, 1949

2,476,898

UNITED STATES PATENT OFFICE 2,476,898

SCHMIDT-TYPE IMAGE PROJECTION APPARATUS

Frederick H. Nicoll, Princeton, N. J., assignor to Radio Corporation of America, a corporation of Delaware Application November 28, 1944, Serial No. 565,457

1 Claim. (Cl. 88—24)

This invention relates to an improvement in television receivers, and, more particularly, to the optical system associated with the image producing tube of the receiver.

In the present invention, a projection type image producing system is employed which utilizes a fast or wide aperture lens system of high quality and which includes the use of mirrors and aspherical correcting plates or lenses. The projection systems of the general type shown herein are well known to those skilled in the art, and examples of such projection systems are to be found, for example, in the patent granted to Landis, No. 2,273,801, issued February 17, 1942; the patent to Ramberg, No. 2,298,808, issued October 13, 1942, as well as the patents granted to Epstein, Nos. 2,295,779, and 2,305,855, and dated September 15, 1942, and December 22, 1942, respectively. In all of these patents the optical system comprises a spherical mirror and a spherical aberration correcting plate.

It is conventional practice, in projecting system of the type above mentioned, to position the image producing tube on the light receiving side of the spherical mirror in order that light from the image producing means may be directed against the mirror and reflected therefrom and later transmitted through the correcting plate. Such arrangements are entirely feasible and, in order to produce the desired focal condition on the image viewing screen, it is necessary properly to adjust the position of the image producing tube within the optical system. In view of the effective speed of the lens this adjustment of the image producing tube is rather critical and relatively small changes in the position of the tube will result in considerable changes in the focal conditions at the viewing screen. Furthermore, in compact optical arrangements, it is possible that the image producing tube may intercept an objectionable proportion of the light reflected from the mirror with the result that the light intensity of the final image on the viewing screen is somewhat reduced. Accordingly, it is desirable to position the image producing tube outside the optical path of the projector in order to prevent any obscuring of the light from the image projector and further in order to render the image producing tube readily accessible in case a replacement of the tube is to be made. Arrangements of this nature have already been proposed in the above mentioned Epstein patent, No. 2,295,779, in which the image producing tube is located on the convex side of the spherical mirror and a reflecting surface is provided on the concave side of the spherical mirror to project light from the image producing tube upon the spherical mirror.

The present invention contemplates such a location of the image producing tube and in order to produce the desired focal conditions at the viewing screen, the image producing tube is located in a definite position and the desired focal condition is produced by accurate adjustments of the position of the reflecting mirror surface. By such an arrangement it is then possible to conveniently and readily replace the image projected tube since any tube having the same end wall configuration, when placed in the image projector, will provide correct, or substantially correct, focal conditions at the viewing screen.

Accordingly, it is, therefore, one purpose of the present invention to provide in an image projector system of the Landis type an arrangement whereby the image producing tube may be readily replaced without materially or appreciably affecting the focal conditions of the image projecting system.

Another purpose of the present invention resides in the provision of means in an image projector for locating the image producing tube outside the optical light path and for placing a reflecting surface within the projector for directing light from the image producing tube upon the spherical reflector of the light projector.

Still another purpose of the present invention resides in the provision of means whereby the position and alignment of the reflecting surface may be conveniently adjusted to producing the desired focal conditions.

A further purpose of the present invention resides in the provision of means whereby the reflecting surface may be moved along the optical axis of the image projector by the operation of a member located outside the optical light path.

Still other purposes and advantages of the present invention will become more apparent to those skilled in the art from the following detailed description particularly when considered in connection with the drawings within, like reference numerals represent like parts, and, wherein:

Fig. 1 shows a preferred form of the present invention;

Fig. 2 shows details of a portion of Fig. 1; and

Fig. 3 shows a sectional view taken along line 3—3 of Fig. 2.

Referring now to the drawings, and to Fig. 1 thereof, there is shown a television receiver 10 to which signals are supplied from a receiving antenna 12 and from the output of which television image signals are available on conductor 14. The image producing system includes an image producing tube 16 preferably of the well known cathode ray projection type. Such tubes are generally of the high beam velocity type and are provided with an end surface 18 which is generally shaped in the form of a portion of a sphere. As is well known to those skilled in the art, the inside surface of the spherical end portion 18 is coated with a fluorescent or luminescent material in order that light may be produced thereby in response to bombardment by a stream of electrons. The electron beam is current modulated by television or image signals available from conductor 14.

The image projector includes a spherical reflecting surface or mirror 20 and a spherical aberration correcting plate 22. These two elements are supported by any convenient means such as the member 24. The shape of the correcting plate together with the relative displacement of the plate and the spherical reflecting surface are disclosed in the above mentioned patents and such relationship need not be herein repeated.

In accordance with the present invention the image producing tube 16 is located on the convex side of the spherical reflecting surface 20 and the central portion of the spherical mirror is provided with an aperture 26 (generally circular). Light from the end wall 18 of the image producing tube 16 is then directed against a reflecting surface or mirror 30 whereby the light is then caused to be directed against the concave side of the spherical mirror 20. Light reflected from this reflecting surface then is transmitted through the correcting plate 22 and is brought to focus upon a viewing screen 32, which is customarily located at a finite distance from the reflector and correcting plate.

The desired focal conditions may be accomplished by altering the position of the image producing tube 16 or by altering the position of the reflecting surface 30. In accordance with the present invention it is desired to maintain the image producing tube in a stationary and fixed position and to effect the desired focal condition at the viewing screen by altering the position of the reflecting surface 30.

Referring now to Figs. 2 and 3 it will be observed that the reflecting surface 30 is supported by three screws 34 which thread into studs 36 attached to the rear surface of the mirror. The screws 34 are positioned in holes in a support plate 38 and these screws are preferably provided with knurled heads 40 in order that they may conveniently be rotated. In order to remove any backlash between the screws 34 and the support studs 36, compression springs 42 are provided which surround each screw and are positioned between the support stud 36 and the support plate 38.

The support plate 38 is carried by a shaft element 44, one end of which is provided with threads 46, and the opposite end is provided with flutes and splines 48. The shaft 44 is positioned inside the enlarged end of a support post 50 which may be, for example, supported by the housing 24.

The splined portion 48 of the support shaft 44 cooperates with a similar splined portion in the enlarged end of the support post 50 and the purpose of such an arrangement is to prevent rotation of the shaft 44. A nut 52 is threaded to co-operate with the threaded portion 46 of the support shaft and by an adjustment of the threaded nut 52 the longitudinal position of the support shaft or rod 44 may be adjusted. In order to maintain the position of the threaded nut 52 against the end surface 56 of the support, a compression spring 58 is provided. This spring surrounds the support rod or shaft and is located within the enlarged position of the support post 50, as indicated in the drawing.

In order to facilitate in the longitudinal adjustment of the reflecting surface 30 the threaded nut 50 may have provided about the periphery a series of teeth 54 which co-operate with a chain or similar member 58. This chain is brought outside the projection systems where a similar wheel or gear 60 is provided and the gear 60 is positioned on a shaft 62 which in turn is supported by bearings in any desirable manner. The shaft 60 is also provided with a crank 64 by means of which the shaft 62 and the gear 60 may be rotated. The rotation of this gear in turn imparts a rotary motion to the threaded nut 52 for adjusting the longitudinal position of the reflecting surface 30 along the optical axis.

In case the plane of the reflecting surface 30 is not properly adjusted, a manipulation of one or another of the screws 34 will produce the desired results. It is preferable that three screws be used in order to facilitate adjustment of position of reflecting surface although a greater number, for example four, could be used. By adjusting the three screws 34 the plane of the reflecting surface 30 may be altered and by rotating the threaded nut 52 the location of the reflecting surface along the optical axis may also be adjusted. By means of these adjustment facilities it is possible to produce the desired focal condition at the viewing screen 32. Once the adjustments have been made it is generally unnecessary to make any further adjustments even though the projection tube is changed since another tube having the same radius of curvature at its end wall and having the same end wall thickness will produce the same focal conditions when the tube end wall is brought to bear against the aperture 26 in the spherical reflecting mirror 20.

The adjustment facilities shown and described herein are of considerable advantage particularly in theatrical projection system and furthermore the convenience with which the image producing tube may be changed is also of considerable importance in such uses since it is desirable that a new tube be placed into service as quickly as possible following the failure of the tube previously in use.

Furthermore, by means of such a construction, a relatively small reflecting surface 30 may be provided so that a minimum of light is obstructed by this portion of the optical system. Accordingly, it will be seen that a convenient and readily operable arrangement has been provided for adjusting the focal conditions of an image projecting system by means of the present invention.

The projection apparatus described herein may be used in conjunction with image source other than television projection tubes. For example, the projection tube 16 may be replaced by moving picture film together with the necessary optical system and film drive mechanism. The successive film frames would then provide the image source. Furthermore, the present apparatus could be used in connection with kaleidoscopic devices, the projection tube being replaced by a kaleidoscope pattern forming element. These suggested modifications could conveniently be used in theatres or similar places of entertainment either separately or in conjunction with television program presentations.

Various alterations and modifications may be made in the present invention without departing from the spirit and scope thereof, and it is desired that any and all such modifications be considered within the purview of the present invention except as limited by the hereinafter appended claim.

I claim:

An image projection device comprising a housing, a spherical mirror supported at the end of said housing having an aperture substantially at the center thereof to receive and position an image source, an aspherical correcting plate positioned in the optical light path of the mirror by said housing, a member having a plane reflecting surface, a support for said member projecting radially inwardly from the wall of said housing, a splined member projecting axially from said support and slidably engaging splines in said support to maintain said member in position along the axis of said housing between the mirror and its first conjugate focus with the reflecting surface facing the mirror and to prevent rotation thereof, a bracket rigidly carried by said splined member at its end, a screw thread on said splined member, a nut engaged with said thread for adjusting the axial position of said splined member, a compression spring urging said nut against said support, said bracket having three apertures equally spaced radially from the axis of said housing and screws engaged in threaded apertures in projections from the rear of said bracket to set the degree of said mirror, a compression spring surrounding each of said screws, and means for rotating the nut on said splined member from a point outside of said casing.

FREDERICK H. NICOLL.

REFERENCES CITED

The following references are of record in the file of this patent:

UNITED STATES PATENTS

| Number | Name | Date |
| --- | --- | --- |
| 1,535,218 | Everett | Apr. 28, 1925 |
| 1,658,557 | Foster | Feb. 7, 1928 |
| 1,673,325 | Godley | June 12, 1928 |
| 1,714,712 | Everett | May 28, 1929 |
| 1,991,861 | May | Feb. 19, 1935 |
| 2,170,979 | Straubel | Aug. 29, 1939 |
| 2,229,302 | Martin | Jan. 21, 1941 |
| 2,273,801 | Landis | Feb. 17, 1942 |
| 2,295,779 | Epstein | Sept. 15, 1942 |
| 2,295,802 | Nicoll | Sept. 15, 1942 |
| 2,309,788 | Ramberg | Feb. 2, 1943 |